United States Patent
Ramina

(10) Patent No.: US 11,535,956 B2
(45) Date of Patent: Dec. 27, 2022

(54) PLANT FOR PRODUCING NON-WOVEN FABRIC

(71) Applicant: RAMINA S.R.L., Grantorto (IT)

(72) Inventor: Graziano Ramina, Grantorto (IT)

(73) Assignee: RAMINA S.R.L., Grantorto (IT)

( * ) Notice: Subject to any disclaimer, the term of this patent is extended or adjusted under 35 U.S.C. 154(b) by 231 days.

(21) Appl. No.: 17/110,399

(22) Filed: Dec. 3, 2020

(65) Prior Publication Data

US 2021/0198812 A1 Jul. 1, 2021

(30) Foreign Application Priority Data

Dec. 6, 2019 (IT) .................... 102019000023235

(51) Int. Cl.
| | |
|---|---|
| *D01D 5/088* | (2006.01) |
| *D01D 5/092* | (2006.01) |
| *D04H 3/02* | (2006.01) |
| *D01D 13/02* | (2006.01) |
| *D04H 3/03* | (2012.01) |
| *B29C 48/05* | (2019.01) |
| *B29C 48/88* | (2019.01) |
| *B29C 48/265* | (2019.01) |
| *B29C 48/92* | (2019.01) |

(52) U.S. Cl.
CPC ............ *D01D 13/02* (2013.01); *B29C 48/05* (2019.02); *B29C 48/265* (2019.02); *B29C 48/88* (2019.02); *B29C 48/92* (2019.02); *D04H 3/03* (2013.01); *B29C 2791/006* (2013.01)

(58) Field of Classification Search
CPC ....... B29C 48/05; B29C 48/265; B29C 48/88; B29C 48/92; B29C 2791/006; D01D 5/088; D01D 5/092; D01D 13/00; D01D 13/02; D04H 3/02; D04H 3/03
USPC ......... 264/40.1, 40.6, 211.14; 425/72.2, 135, 425/143, 378.2, 382.2
See application file for complete search history.

(56) References Cited

U.S. PATENT DOCUMENTS 8,992,810 B2    3/2015   Schutt et al.

FOREIGN PATENT DOCUMENTS

| CN | 206545070 U | 10/2017 |
| DE | 10046611 A1 | 3/2001 |
| DE | 202018006267 U1 | 10/2019 |
| EP | 1340843 A1 | 9/2003 |

OTHER PUBLICATIONS

Database WPI Week 201776 Thomson Scientific, London, GB; AN 2017-70460L XP002799441, & CN 206 545 070 U (Tiandingfeng Polypropylene Materials Tec) Oct. 10, 2017 (Oct. 10, 2017).

*Primary Examiner* — Leo B Tentoni
(74) *Attorney, Agent, or Firm* — Mark M. Friedman

(57) ABSTRACT

Plant for producing non-woven fabric, which comprises a cooling chamber provided with a first and with a second cooling section traversed by filaments of non-woven fabric. In addition, the plant comprises a feed duct connected to the cooling chamber in order to convey, within the latter, a cooling gas by means of the action of a fan, and provided with a first and with a second valve arranged for determining corresponding flows of the cooling gas to be introduced, respectively, in the first and in the second cooling section. A pressure sensor is employed in order to determine the pressure in the cooling chamber, by controlling the fan in a feedback manner.

15 Claims, 3 Drawing Sheets

PLANT FOR PRODUCING NON-WOVEN FABRIC

FIELD OF APPLICATION

The present invention regards a plant for producing non-woven fabric, in particular made of plastic material.

The present plant for producing non-woven fabric is intended to be advantageously employed in the field of production of fiber webs adapted to form a non-woven fabric, normally web-like.

In particular, the plant for producing non-woven fabric, object of the present invention, is advantageously employable for producing a continuous web of semifinished non-woven fabric, intended to undergo successive transformations in order to obtain a finished product.

Such webs are normally used for producing sanitary products, such as caps, masks and gloves or in the field of agriculture for producing non-woven fabric intended to be laid on the ground to be cultivated, in order to prevent the formation of weeds and/or in order to protect seeds.

The invention is therefore inserted in the industrial field of production of non-woven fiber web-like material, i.e. more generally, in the field of production of non-woven fabric.

STATE OF THE ART

For some time in the field of production of plastic material fiber webs, it has been known to produce non-woven fabric, such as polypropylene spunbond, polyester spunbond and/or other polymer spunbond, in particular for producing bandages, gauzes, caps, masks and other sanitary products, or for example for producing non-woven fabric intended to be used in the farming field for covering terrain to be cultivated.

More generally, the non-woven fabric is a semifinished product intended to undergo successive processing steps in order to produce products of various nature, normally made of plastic material and with web shape or with superimposed webs. Such webs are formed by filaments randomly placed in layers and only joined mechanically, or by means of adhesives, or at least partially melted together by means of heat.

In the aforesaid technical field of the production of non-woven fabric, plants for producing non-woven fabric have been known for some time which normally provide for the formation of a plurality of plastic material filaments, which are stretched, laid on a conveyor belt and then pressed on each other in a random manner, in order to form the aforesaid webs of non-woven fabric.

One example of a plant for producing non-woven fabric is described in the document U.S. Pat. No. 8,992,810. The plant described herein is vertically extended along a main channel, along which various operating stations are vertically provided for in succession for the production of the aforesaid filaments of plastic material.

On the upper part, a station is provided for extruding a plurality of plastic material filaments at high temperature, which are introduced within the main channel through an upper inlet mouth, at which an extrusion head is placed from which the filaments exit on the lower part. As is known, such extrusion head is provided on the lower part with a plurality of holes facing the upper inlet opening, from which a mass of melted plastic material exits outward in filament form.

The filaments are normally extruded in pasty plastic material form, at high temperature, normally comprised between 150° C. and 280° C.

On the lower part, a cooling station (known with the term "quenching" in the technical jargon of the field) is provided, in which an air flow is forcibly introduced within the main channel, by means of at least one fan placed outside the latter.

The air flow introduced into the cooling station cools the filaments being formed at the outlet of the extrusion head of the extrusion station.

The cooling station comprises lateral walls, normally metallic, which define a cooling volume, at a first section of the main channel, within which high-temperature filaments start to cool.

More in detail, the cooling station comprises an upper portion fed by means of a first air flow and a lower portion fed with a second air flow.

In addition, the plant of known type provides for a first feed duct placed in fluid connection with the upper portion and susceptible of being traversed by the first air flow and a second feed duct placed in fluid connection with the lower portion of the cooling station and susceptible of being traversed by the second air flow.

The first flow and the second air flow of the cooling station are heated by means of two respective first and second heat exchanger place outside the main channel, respectively to intercept the first feed duct and the second feed duct.

In this manner, the air of the first and of the second flow is brought to a temperature close to that of the filaments so as to cool them without subjecting them to a thermal shock due to an overly high temperature jump.

It is known from patent EP 1340843 that the temperature of the first heat exchanger is different from the temperature of the second heat exchanger, so as to obtain a progressive cooling of the filaments.

In order to stretch the filaments obtained from the extrusion station and subsequently cooled by the cooling station, the plant normally provides for an adjustment station, in which the air introduced into the first introduction section elongates the plastic material filaments within a reduced section part of the main channel, up to making them reach the desired size, i.e. until they reach a linear density of about 1-5 dtex.

In order to obtain the desired weave (i.e. a substantially random and uniform arrangement of the filaments) for the production of the non-woven fabric, it is necessary to randomly weave the filaments together, forming a dense weave substantially without interruption.

For such purpose, the plant of known type is provided with a deposition station at a terminal section of the main channel, which on the lower part terminates with an outlet opening opposite the inlet opening.

More in detail, the air that flows within the terminal section of the main channel is moved in a manner such to confer a turbulent motion thereto. In this manner, the filaments are thrust by the air and are woven together in a substantially random manner in order to form the aforesaid desired weave of the non-woven fabric.

The terminal section of the main channel is extended downward, and in particular towards the outlet opening, it comprises a diffuser with substantially frustoconical shape. The air that flows at its interior therefore encounters an increase of the duct section and slows, up to taking on a turbulent motion, mixing and weaving the filaments that slide within the terminal section itself.

The plant of known type provides for, below the deposition section, a conveyor belt placed below the outlet opening with which the terminal section of the main channel terminates in order to receive the filaments.

The conveyor belt is moved in order to advance the filaments set thereon along a substantially horizontal movement direction, in order to form the web of non-woven fabric.

Subsequently, the web of non-woven fabric thus obtained further undergoes processing steps such as a pressing and is then moved towards a winding station in which the web is wound around a support core in order to form reels of non-woven fabric, allowing a quick storage and transportation thereof.

The plant for producing non-woven fabric of known type briefly described up to now has in practice shown that it does not lack drawbacks.

The main drawback lies in the fact that the plant of known type is extremely complex to control during normal operation, especially for controlling the temperatures of the air flows of the cooling station.

A further drawback lies in the fact that the plant of known type requires a great amount of electrical energy in order to operate, leading to a considerable expense for keeping it running.

In particular, the first and the second heat exchanger for the first and the second air flow of the cooling station require a great amount of electrical energy in order to operate in a continuative manner and heat the two air flows at the two different requested temperatures.

A further drawback of the plant of known type lies in the fact that the first and the second air flow of the cooling station require two different fans placed to intercept the respective first and second feed duct.

A further drawback lies in the fact that the first and the second exchanger of the plant of known type are very costly and complex to install, since they are subjected to the pressure of the fans, placed upstream of the exchangers themselves along the respective feed ducts.

More in detail, the fans of the plant of known type are configured for pushing the air flows at a pressure of several tens of thousands of Pascal through the respective heat exchangers, actually involving the need to install exchangers made of reinforced steel, capable of resisting the aforesaid pressures, and considerably increasing the cost of the plant.

PRESENTATION OF THE INVENTION

In this situation, the problem underlying the present invention is therefore that of overcoming the drawbacks manifested by the plants for producing non-woven fabric of known type, by providing a plant for producing non-woven fabric which is structurally simple and operates with limited energy consumptions.

A further object of the present invention is to provide a plant for producing non-woven fabric which is provided with a limited production and sales cost.

A further object of the present invention is to provide a plant for producing non-woven fabric which is operatively simple, reliable and capable of operating in any operating condition.

A further object of the present invention is to provide a plant for producing non-woven fabric which is simple to use by operators.

A further object of the plant for producing non-woven fabric, object of the present invention, is to provide a plant for producing non-woven fabric which is inexpensive to maintain in operation in a continuative manner.

BRIEF DESCRIPTION OF THE DRAWINGS

The technical characteristics of the invention, according to the aforesaid objects, and the advantages thereof will be more evident in the following detailed description, made with reference to the enclosed drawings, which represent a merely exemplifying and non-limiting embodiment of the invention, in which.

DETAILED DESCRIPTION OF A PREFERRED EMBODIMENT

With reference to the enclosed drawings, reference number 1 overall indicates a plant for producing non-woven fabric, according to the present invention.

This is intended to be employed for producing non-woven fabric of different type and material, such as in particular spunbond made of plastic material, e.g. polypropylene and/or polyethylene, and in particular polyethylene terephthalate (PET in the technical jargon of the field).

Hereinbelow reference will be made to a plant 1 for producing non-woven fabric made of plastic material, in accordance with the preferred embodiment illustrated in the enclosed figures. Nevertheless, the plant 1 of the present invention can be advantageously employed also for producing non-woven fabric of another kind, per se well known to the man skilled in the art and hence not described in detail hereinbelow. Therefore, hereinbelow with the term "non-woven fabric", it must be intended a substantially web-like material composed of a plurality of filaments compressed on each other in a substantially random manner.

In particular, the non-woven fabric is normally composed of a plurality of plastic material filaments joined together by means of a mechanical action, e.g. by means of crushing.

Figure 1:
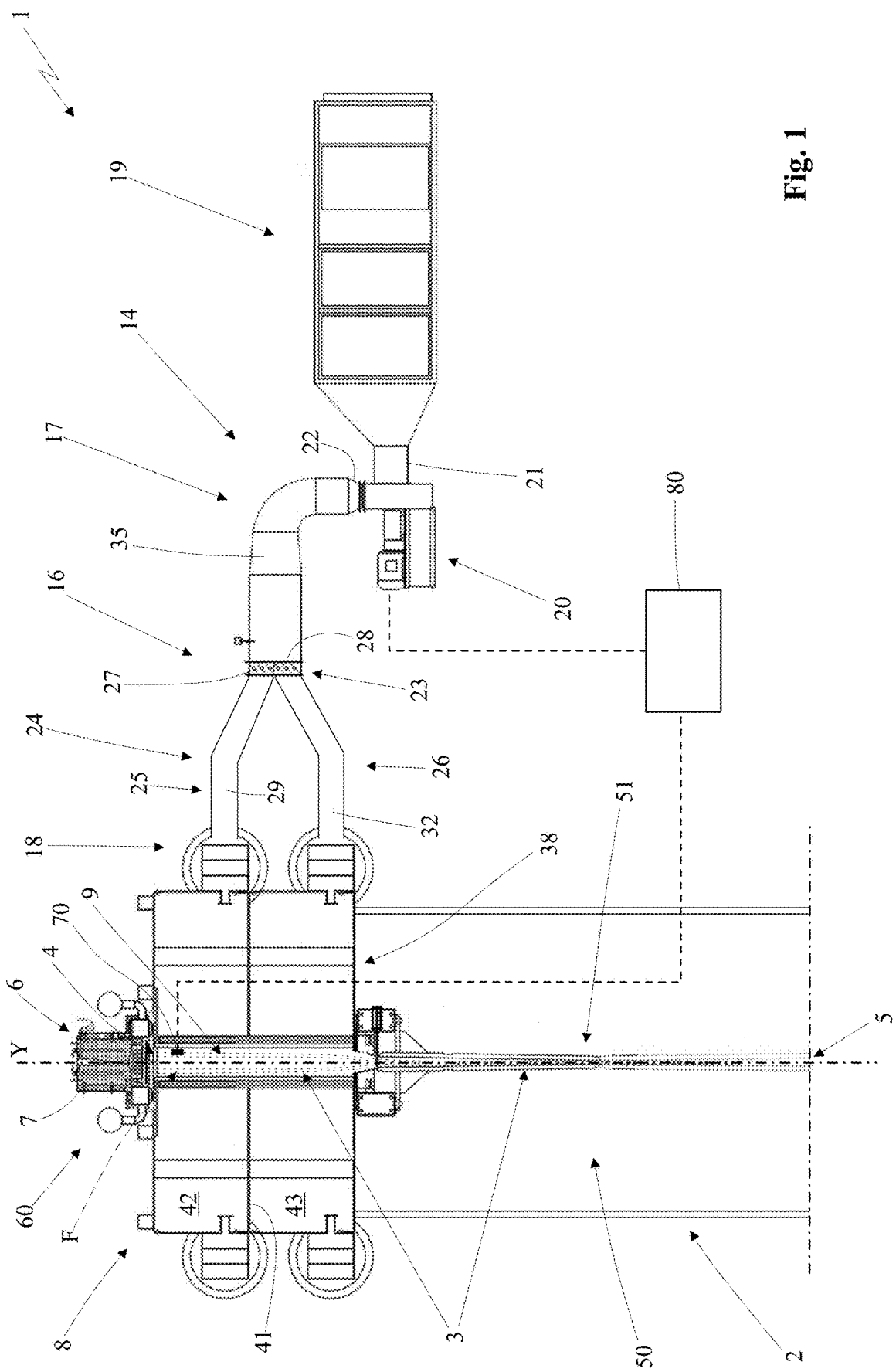
FIG. 1 shows a schematic front view of a plant for producing non-woven fabric, object of the present invention.

With reference to the example of FIG. 1, the plant 1 for producing non-woven fabric according to the invention comprises a support structure 2 (illustrated in a schematized manner in FIG. 1) provided with a main channel 3 extended along a vertical axis Y from an upper inlet mouth 4 for the introduction of filaments F for forming a non-woven fabric to a lower outlet mouth 5 for the expulsion of the filaments F.

Advantageously, the support structure 2 is intended to be set on the ground and preferably it is made of resistant metal material, such as steel and in particular stainless steel (non-oxidizable), such as AISI 304 steel or AISI 431 steel.

The plant 1 advantageously comprises a feeding station 6 placed above the main channel 3 and in communication with the inlet mouth 4 of the latter in order to introduce filaments F into the main channel 3 for forming a non-woven fabric.

Preferably, the feeding station 6 comprises a system for forming melted plastic material placed in flow connection with the inlet mouth 4 of the main channel 3 and comprising an extruder (per se known to the man skilled in the art and hence not described in detail hereinbelow), preferably supported by the support structure 2, adapted to form a continuous flow of melted plastic material and an extrusion head 7 mechanically supported by the support structure 2, placed in fluid connection with the extruder and provided with an extrusion plate facing towards the inlet mouth 4 of the main channel 3. The extrusion plate of the extrusion head 7 of the feeding station 6 is advantageously provided with a plurality of through holes, susceptible of being traversed by the flow of melted plastic material in order to form the filaments F. The filaments F are normally extruded in the form of pasty plastic material, at high temperature, normally comprised between 150° C. and 280° C.

In operation, the filaments 7 thus formed pass through the inlet mouth 4 and enter into the main channel 3 in order to allow a processing thereof through a plurality of operating stations, as described in detail hereinbelow.

According to the invention, the plant 1 comprises a cooling station 8, which is placed along the main channel 3 below the inlet mouth 4 and defines, in the main channel 3 itself, a cooling chamber 9.

Advantageously, the cooling chamber 9 corresponds to a corresponding longitudinal section (parallel to the vertical axis Y) of the main channel 3. As described in detail hereinbelow, in the aforesaid cooling chamber 9, a cooling gas (e.g. air) is susceptible of being forcibly introduced in order to cool the filaments F coming from the outlet of the extrusion head 7 of the feeding station 6.

Advantageously, with reference to the example of FIG. 1, the plant 1 also comprises a lengthening station 50 placed, along the main channel 3, below the cooling station 8, in order to elongate filaments 7 coming from the latter. In particular, the lengthening station 50 is provided with a stretching duct 51 (which can be of the type per se known to the man skilled in the art) extended along the vertical axis Y and extended between the cooling chamber 9 and the outlet mouth 5 of the main channel 3, defining a corresponding lower section of the main channel 3.

Below the outlet mouth 5 of the main channel 3, a deposition zone (not illustrated) is arranged that is adapted to receive the filaments exiting from the stretching duct 51 and, defined for example by a conveyor belt. The deposition zone therefore remains defined as the area of an abutment surface that faces the outlet mouth 5 of the main duct 3 and has for example substantially rectangular shape.

Preferably, the plant 1 comprises a monomer suction station 60 placed at the inlet mouth 4 of the main channel 3, comprising a suction system 90 (schematically illustrated) placed in fluid communication with the main channel 3 in order to suction a suction flow.

More in detail, the monomer suction station 60 is configured in order to expel from the main channel 3, by means of the suction flow, possible fumes produced during the extrusion of the plastic material from the extrusion head 7 through a stack (not illustrated), which connects the main channel 3 of the plant 1 with the outside environment.

More in detail, the monomer suction station 60 comprises at least one expulsion duct 61 placed in fluid connection with the main channel 3, in particular placed in fluid connection with the extrusion plate of the extrusion head 7, in order to convey the fumes produced by the latter towards the aforesaid stack.

The expulsion duct is adapted to convey the fumes and the vapors produced by the melted plastic material, extruded into the filaments 7 by the extrusion head, which could adhere to the internal walls of the main channel 3, forming crusts. According to the invention, with reference to FIG. 2, the cooling chamber 9 of the cooling station 8 comprises a first cooling section 10 extended along the vertical axis Y and provided with a first feed opening 11, and a second cooling section 12 also extended along the vertical axis Y and provided with a second feed opening 13.

The second cooling section 12 is placed below the first cooling section 10, preferably as a continuation of the latter, in a manner such that the latter is placed between the inlet mouth 4 of the main channel 3 and the second cooling section 12 itself.

In addition, the plant 1 comprises a cooling system 14 in fluid connection with the cooling chamber 9 by means of the aforesaid first feed opening 11 and second feed opening 13, and adapted to introduce, into the cooling sections 10, 12 of the cooling chamber 9, at least one cooling gas for cooling the filaments F susceptible of traversing the cooling chamber 9 itself.

Advantageously, the cooling station 8 comprises an internal wall 15 which is extended according to the vertical axis Y laterally delimiting the cooling chamber 9. Preferably, the aforesaid internal wall 15 delimits the extension of the cooling chamber 9 transverse to the vertical axis Y. For example, such internal wall 15 can comprise multiple sides (e.g. four sides two-by-two parallel) which define corresponding longitudinal flanks of the cooling chamber 9, in particular parallel to the vertical axis Y.

Suitably, the internal wall 15 is provided with the aforesaid first feed opening 11, at the first cooling section 10, and with the aforesaid second feed opening 13, at the aforesaid second cooling section 12.

For example, the first feed opening 11 and the second feed opening 13 are advantageously attained by means of corresponding plurality of through holes made on the internal wall 15, respectively along the first cooling section 10 and the second cooling section 12 of the cooling chamber 9.

Otherwise, in accordance with a different embodiment of the plant 1 not illustrated in the enclosed figures, the internal wall 15 can be attained by means of a grill, or a cell-like wall, whose substantially checkerboard-like openings define the aforesaid feed openings 11, 13.

According to the invention, with reference to FIG. 1, the cooling system 14 comprises a feed duct 16 extended between an inlet section 17 and an outlet section 18 and adapted to convey a cooling gas (e.g. air) to the cooling chamber 9. For such purpose, the outlet section 18 of the feed duct 16 is placed in fluid connection with the first feed opening 11 of the first cooling section 10 and with the second feed opening 13 of the second cooling section 12 of the cooling chamber 9.

In addition, the cooling system 14 comprises a heat exchanger 19 operatively connected to the inlet section 17 of the feed duct 16 in order to vary the temperature of the aforesaid cooling gas.

The cooling system 14 also comprises a fan 20 operatively connected to the inlet section 17 of the feed duct 16 and susceptible of making the cooling gas flow through the heat exchanger 19 and through the feed duct 16 from the inlet section 17 towards the outlet section 18 of the latter.

For example, the fan 20 is a rotary fan, of the type per se well known to the man skilled in the art and therefore not described in detail hereinbelow.

Advantageously, in accordance with the particular embodiment of FIG. 1, the fan 20 is interposed between the heat exchanger 19 and the inlet section 17 of the feed duct 16, and is configured for suctioning (under reduced pressure) the cooling gas through heat exchanger 19 and introducing it (under pressure) into the inlet section 17 of the feed duct 16. In particular, the fan 20 is provided with a suction mouth 21 connected to the heat exchanger 19 and a delivery mouth 22 connected to the inlet section 17 of the feed duct 16.

In accordance with a different, non-illustrated implementation configuration of the present invention, the fan 20 is placed upstream of the heat exchanger 19 in order to introduce the cooling gas under pressure both into the latter and into the feed duct 16. In particular, according to such implementation configuration, the heat exchanger 19 is placed between the inlet section 17 of the feed duct 16 and the fan 20, which has its delivery mouth 22 connected to the heat exchanger 19 itself.

In accordance with a preferred embodiment, the heat exchanger 19 is an exchanger of water-air type, in particular an exchanger of water-air type with tube bundle.

Preferably, the heat exchanger 19 is adapted to bring the cooling gas to a constant temperature comprised between 20° C. and 30° C. and in particular comprised between 22° C. and 25° C.

Advantageously, the heat exchanger 19 is arranged to exchange thermal energy with the cooling gas so as to bring the temperature thereof to the desired value, preferably in the above-indicated intervals. In particular, for such purpose, the heat exchanger 19 is adapted to transfer heat to the cooling gas or to absorb heat from the latter, as a function of the temperature of the cooling gas entering the heat exchanger 19 itself (and which can vary for example according to the temperature of the outside environment). Suitably, the heat exchanger 19 is provided with one or more cooling sets and with one or more heating sets such that it can be arranged to absorb or transfer heat as a function of the initial temperature of the cooling gas and of the final temperature that one desires to obtain.

According to the invention, the cooling system 14 comprises a modulation system 23 placed to intercept the feed duct 16 between the inlet section 17 and the outlet section 18 and adapted to regulate the flow of the cooling gas, as described in detail hereinbelow.

In accordance with the idea underlying the present invention, the feed duct 16 is provided with a dividing structure 24 which divides the feed duct 16, at least at the outlet section 18 of the latter, at least into two separate sectors 25, 26 adapted to convey separate flows of cooling gas to the cooling sections 10, 12 of the cooling chamber 9. Such sectors 25, 26 comprise a first sector 25, which is in fluid connection with the first feed opening 11 of the first cooling section 10, and in a second sector 26, which is in fluid connection with the second feed opening 13 of the second cooling section 12.

In addition, the aforesaid modulation system 23 comprises at least two valves 27, 28 adapted to regulate the flow of the cooling gas in the two aforesaid sectors 25, 26 and, therefore, in the corresponding cooling sections 10, 12.

More in detail, the modulation system 23 comprises a first valve 27 placed to intercept the first sector 25 of the feed duct 16 and arranged for feeding the first feed opening 11 of the first cooling section 10 with a first flow of the cooling gas.

In addition, the modulation system 23 comprises a second valve 28 placed to intercept the second sector 26 of the feed duct 16 and arranged for feeding the second feed opening 13 of the second cooling section 12 with a second flow of the cooling gas.

In particular, the valves 27, 28 of the modulation system 23 can be set and/or imposed in order to define, in the corresponding sector 25, 26, a corresponding passage section susceptible of being traversed by the cooling gas, in a manner such to determine the flow of the cooling gas that traverses the corresponding sector 25, 26. In detail, the valves 27, 28 allow reducing or increasing the corresponding aforesaid passage section, so as to respectively reduce or increase the corresponding flow of the cooling gas.

In this manner, advantageously, the claimed configuration of the feed duct 16 and of the modulation system 23 allows conveying, into the two cooling sections 10, 12, corresponding flows of the cooling gas, by employing only one fan and by means of a simple sectioning of the feed duct 16, ensuring low energy consumptions of the plant and, simultaneously, a configuration of the plant 1 that is simple and inexpensive to make.

Advantageously, the first sector 25 of the feed duct 16 comprises a first branch 29, which is extended between a first inlet end 30, which is in fluid connection with the inlet section 17 of the feed duct 16, and a first outlet end 31, which is in fluid connection with the first feed opening 11 of the first cooling section 10 of the cooling chamber 9. In addition, the second sector 26 of the feed duct 16 comprises a second branch 32, which is extended between a second inlet end 33, which is in fluid connection with the inlet section 17 of the feed duct 16, and a second outlet end 34, which is in fluid connection with the second feed opening 13 of the second cooling section 12 of the cooling chamber 9.

Figure 3:
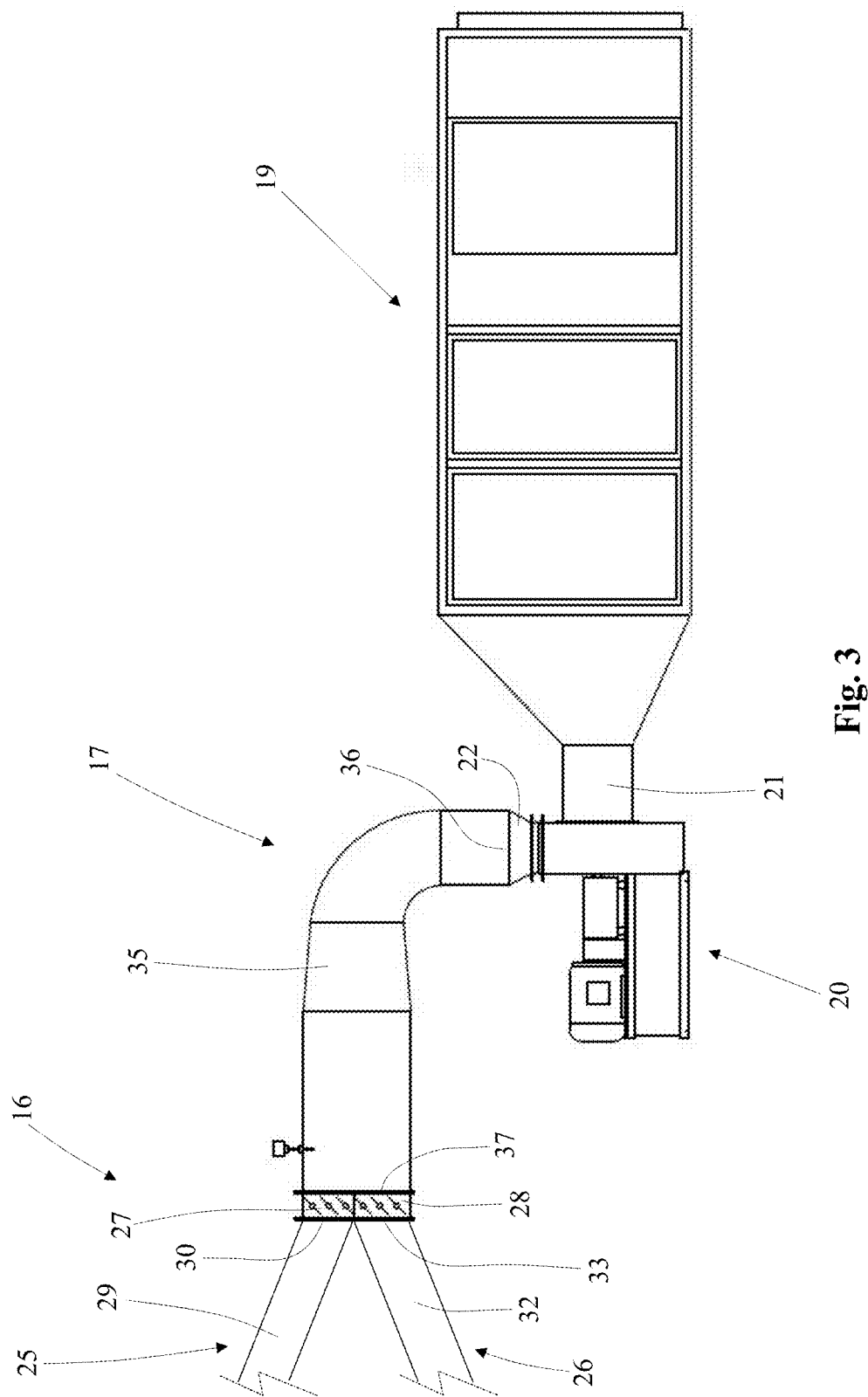
FIG. 3 shows a schematic front view of a detail of the plant for producing non-woven fabric illustrated in FIG. 1, regarding part of a cooling system of the cooling station.

Advantageously, with reference to FIGS. 1 and 3, the feed duct 16 comprises a connector tube 35, which is extended between a first end 36 connected to the inlet section 17 and a second end 37 connected to the dividing structure 24.

In particular, the first end 36 of the connector tube 35 defines the corresponding termination of the inlet section 17 of the feed duct 16 and, preferably, according to the particular example of FIG. 3, is connected to the delivery mouth 22 of the fan 20.

Advantageously, the second end 37 of the connector tube 35 is connected to the first inlet end 30 of the first branch 29 and to the second inlet end 33 of the second branch 32.

Suitably, the first branch 29 and the second branch 32 are extended, starting from their corresponding inlet ends 30, 33, as branching from the second end 37 of the connector tube 35, in particular by means of a bifurcation of the latter.

For example, the two branches 29 and 32 are obtained in the form of corresponding pipes.

Of course, without departing from the protective scope of the present patent, the two sectors 25, 26 of the feed duct 16 can also be obtained in a form different from that of the above-described example, for example by means of a longitudinal separator placed within the feed duct 16 (even only at the outlet section 18 of the feed duct 16, and/or with or without the connector tube 35).

Advantageously, the first valve 27 is placed to intercept the first branch 29 and the second valve 28 is placed to intercept the second branch 32.

Preferably, with reference to the example of FIGS. 1 and 3, the first valve 27 is placed at the first inlet end 30 of the first branch 29, and the second valve 28 is placed at the second inlet end 33 of the second branch 32, in particular interposed between the second end 37 of the connector tube 35 and the corresponding aforesaid inlet ends 30, 33.

Of course, in accordance with different embodiments of the present invention, the valves 27, 28 can be placed in different points of the respective sectors 25, 26 (and in particular of the respective branches 29, 32), for example between the inlet end 30, 33 and the outlet end 31, 34 of the corresponding branch 29, 32, or at the corresponding outlet end 31, 34.

For example, the two valves 27, 28 can comprise corresponding modulatable slide gates, provided with one or more shutters (e.g. in the form of orientable blades) that can be moved in order modify the passage section of the valve 27, 28 and, hence, of the corresponding sector 25, 26.

In particular, the shutter of each valve 27, 28 can be settable or positionable in a manual and/or motorized manner, and/or in a permanent or modifiable manner.

Advantageously, the first valve 27 and the second valve 28 of the modulation system 23 is arranged in a manner such that the first flow of the cooling gas (in the first sector 25) is always greater than the second flow of the cooling gas (in the second sector 26).

Advantageously, the first flow is greater than the second flow—at least 10% greater than the value of the latter, and preferably at least 20% greater. In particular, the first flow is greater than the second flow by a percentage comprised between about 30% and 100% of the latter.

For example, the first flow is comprised between 2000 m$^3$/h and 10000 m$^3$/h, and the second flow is comprised between 1000 m$^3$/h and 5000 m$^3$/h (as a function for example of the material and of the thickness of the filaments), while always maintaining the first flow greater than the second flow, and advantageously the aforesaid proportions.

Advantageously, the valves 27, 28 of the modulation system 23 and the suction system 90 of the monomer suction station 60 are arranged in a manner such that the difference between the first flow (in the first sector 25) and the second flow (in the first sector 25) is greater than or equal to the suction flow suctioned by the suction system 90 from the central channel 3 (and in particular from the cooling chamber).

In this manner it is possible to ensure a pressure stability and simultaneously prevent the formation of turbulences within the main channel 3 at the cooling station 8.

Indeed, such provision allows remedying a reduced pressure within the central channel 3, in particular due to the suction of the aforesaid suction system 90.

More in detail, the suction flow suctioned from the central channel 3 defines a reduced pressure within the latter at the suction system 90 of the monomer suction station 60. Such reduced pressure leads to an undesired turbulence of the air that flows within the central channel 3.

Preferably, the first cooling section 10 and the second cooling section 12 of the cooling chamber 9 substantially have the same pressure.

For example, the pressure in the cooling chamber 9 is comprised between 1000 Pa and 17000 Pa, in particular between 1200 Pa and 12000 Pa.

Advantageously, the pressure in the cooling chamber 9 is determined by controlling, in a feedback manner, the fan 20, by means of the use for example of one or more pressure sensors 70 associated with the cooling chamber 9 itself.

Preferably, the temperature of the first flow is equal to the temperature of the second flow and, in particular, as indicated above comprised between 20° C. and 30° C. and in particular comprised between 22° C. and 25° C.

In particular, the pressure sensor 70 is operatively associated with the cooling chamber 9 in order to detect pressure measurements indicative of the pressure in the cooling chamber 9.

Preferably, the pressure sensor 70 is positioned within the cooling chamber 9, for example at the first cooling section 10 of the latter. Of course, the pressure sensor 70 can also be placed in other parts of the plant 1 connected to and/or associated with the cooling chamber 9 (e.g. in the containment body 38, in particular at the first or second feed opening 11, 13) in a manner such to allow the pressure sensor 70 to detect measurements relative to the pressure within the cooling chamber 9 itself.

Suitably, the pressure sensor 70 is operatively connected to the fan 20, in a manner such that the operation of the latter can be controlled on the basis of the pressure measurements detected by the pressure sensor 70 itself.

The use of the pressure sensor 70 associated with the cooling chamber 9 thus allows setting and maintaining an operating pressure within the latter that allows subjecting the filaments F for forming the non-woven fabric to an action of the cooling gas which allows cooling and stressing (in particular stretching) the filaments F in a suitable manner with respect to the diameter and/or to the material of the latter.

Advantageously, the plant 1 comprises a control unit 80, in particular provided with a computer, such as a PLC. Such control unit 80 operatively connects the pressure sensor 70 to the fan 20 in order to control the latter in a feedback manner.

More in detail, the control unit 80 is operatively connected to the pressure sensor 70 in order to receive from the latter the pressure measurements indicative of the pressure in the cooling chamber 9, and is operatively connected to the fan 20 in order to drive it as a function of such pressure measurements.

In particular, the control unit 80 is arranged for driving the operation of the fan 20 such that the latter maintains the pressure in the cooling chamber 9 at a preset reference value, determined for example as a function of the diameter of the filaments F for forming the non-woven fabric and/or of the material of such filaments F.

Advantageously, the control unit 80 is arranged for executing a comparison of the pressure measurements received from the pressure sensor 70 with the aforesaid reference value, and for varying the operating speed of the fan 20 as a function of the result of such comparison.

In particular, the control unit 80 is adapted to drive the rotation speed of the impeller (or impellers) of the fan 20, so as to regulate the pressure imparted by the fan in the flow of cooling gas generated thereby.

For example, if the pressure sensor 70 detects pressure measurements lower than the reference value, the control unit 80 drives the fan 20 to increase its operating speed, so as to increase the pressure in the cooling chamber 9, and vice versa.

In particular, the control unit 80 can compare the pressure measurements also with multiple reference values, for example in order to verify if such measurements fall within a specific reference interval.

Advantageously, the arranging of the valves 27, 28 of the modulation system 23 and the arranging of the pressure sensor 70, according to the invention, allow ensuring, within the cooling chamber 9, the operating pressure and the flow difference between the first and the second cooling section 10, 12 suitable for cooling and stressing the filaments F as a function of the characteristics of the non-woven fabric to be obtained. In particular, this allows appropriately cooling the filaments F by employing the cooling gas at the same temperature in the two cooling sections 10,12 of the cooling chamber 9.

Figure 2:
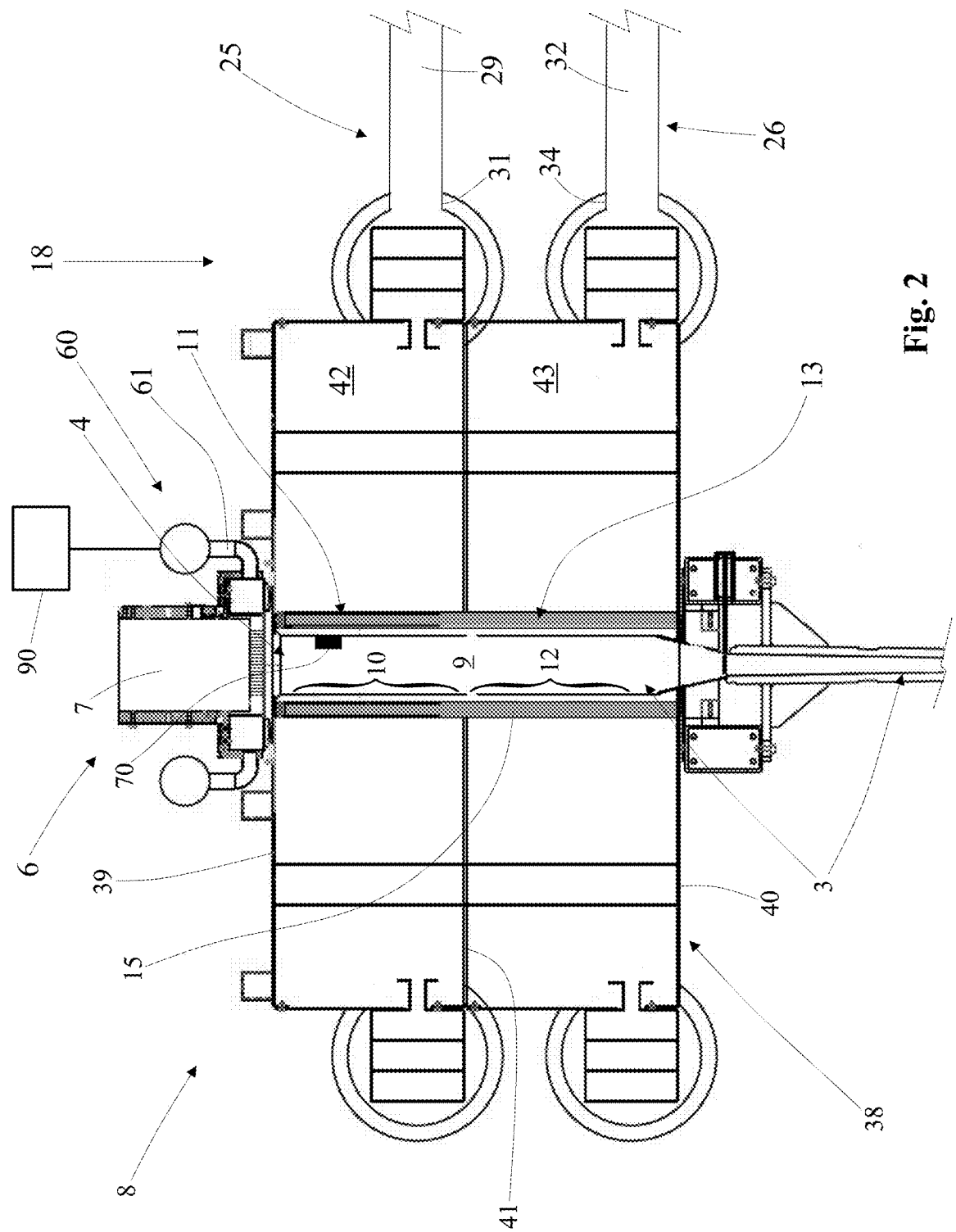
FIG. 2 shows a schematic front view of a detail of the plant for producing non-woven fabric illustrated in FIG. 1, regarding the cooling station.

Advantageously, with reference to the FIGS. 1 and 2, the feed duct 16, and in particular its outlet section 18, comprises a containment body 38, which is extended along the vertical axis Y of the main channel 3 between an upper end 39 and a lower end 40.

Suitably, such containment body 38 comprises the aforesaid internal wall 15 (which defines the cooling chamber 9).

Preferably, the containment body 38 comprises, at its interior, a dividing wall 41, which is placed between the upper end 39 and the lower end 46 of the latter, in particular extended transverse to the vertical axis Y. Such dividing wall 41 defines, within the containment body 38, an upper manifold 42 and a lower manifold 43.

More in detail, the upper manifold 42 is extended between the upper end 39 of the containment body 38 and the dividing wall 41, and connects the first feed opening 11 of the first cooling section to the first sector 25 of the feed duct 16. The lower manifold 43 is extended between the dividing wall 41 and the lower end 40 of the containment body 38 and connects the second feed opening 13 of the second cooling section 12 to the second sector 26 of the feed duct 16.

In particular, the upper manifold 42 and the lower manifold 43 can be considered, at least from the functional/operating standpoint, as part of the outlet section 18 of the feed duct 16, and in particular as a part respectively of the first sector 25 and of the second sector 26. Optionally, according to a particular non-illustrated embodiment of the present invention, the first valve 27 and the second valve 28 can be placed, respectively, in the upper manifold 42 and in the lower manifold 43.

Also forming the object of the present invention is a method for operating the above-described plant 1, regarding which the same reference numbers will be maintained for the sake of description simplicity.

Such operating method provides that the filaments F for forming a non-woven fabric are introduced into the main channel 3 of the plant 1, in particular by means of the system for forming melted plastic material and the extrusion head 7, described above.

The cooling system 14 introduces a cooling gas in the cooling chamber 9, such cooling gas intended for cooling the filaments F which traverse the cooling chamber 9. In particular, the fan 20 makes the cooling gas flow through the heat exchanger 19 and through the feed duct 16 from the inlet section 17 towards the outlet section 18 of the latter, so as to convey the cooling gas into the cooling chamber 9.

In accordance with the idea underlying the present invention, the operating method provides for arranging the first valve 27 of the modulation system 23 in order to feed the first feed opening 11 of the first cooling section 10 with a first flow of the cooling gas, and for arranging the second valve 28 of the modulation system 23 in order to feed the second feed opening 13 of the second cooling section 12 with a second flow of the cooling gas, so as to regulate/set the corresponding flows of the cooling gas in the cooling sections 10, 12, in accordance with that described above. In particular, the valves 27, 28 can be set during plant installation, or in a subsequent step of maintenance adjustment, as a function of the characteristics of the non-woven fabric to be produced.

In addition, during the operation of the plant, the pressure in the cooling chamber 9 is determined by controlling, in a feedback manner, the fan 20, by means of the use of the pressure sensor 70 associated with the cooling chamber 9.

Advantageously, the control unit 80 of the plant receives, from the pressure sensor 70, pressure measurements indicative of the pressure in the cooling chamber 9, and drives the fan 20 as a function of such pressure measurements, as previously discussed in detail.

The invention thus conceived therefore attains the pre-established objects.

The contents of the Italian patent application number 102019000023235, from which this application claims priority, are incorporated herein by reference.

The invention claimed is:

1. A plant for producing non-woven fabric, the plant comprising:
   a support structure (2) provided with a main channel (3), which is extended, along a vertical axis (Y), from an upper inlet mouth (4) for the introduction of filaments (F) for forming a non-woven fabric, to a lower outlet mouth (5) for the expulsion of said filaments (F);
   a cooling station (8), which is placed along said main channel (3) below said inlet mouth (4) and defines, in said main channel (3), a cooling chamber (9), which comprises:
   a first cooling section (10) extended along said vertical axis (Y) and provided with a first feed opening (11),
   a second cooling section (12) extended along said vertical axis (Y), provided with a second feed opening (13) and placed below said first cooling section (10);
   a cooling system (14), which is in fluid connection with said cooling chamber (9) by means of said first feed opening (11) and said second feed opening (13), and is configured for introducing, into said cooling chamber (9), at least one cooling gas for cooling said filaments (F) susceptible of traversing said cooling chamber (9),
   wherein said cooling system (14) comprises:
   a feed duct (16), extended between an inlet section (17) and an outlet section (18), wherein said outlet section (18) is placed in fluid connection with the first feed opening (11) of said first cooling section (10) and with the second feed opening (13) of said second cooling section (12);
   at least one heat exchanger (19) operatively connected to said feed duct (16) in order to vary the temperature of said cooling gas;
   at least one fan (20) operatively connected to the inlet section (17) of said feed duct (16) and configured for making said cooling gas flow through said heat exchanger (19) and through said feed duct (16) from said inlet section (17) towards said outlet section (18);
   a modulation system (23), which is placed to intercept said feed duct (16) between said inlet section (17) and said outlet section (18), and is configured for regulating the flow of said cooling gas;
   wherein said feed duct (16) is provided with at least one dividing structure (24) which divides said feed duct (16), at least at said outlet section (18), at least into a first sector (25), which is in fluid connection with the first feed opening (11) of the first cooling section (10) of said cooling chamber (9), and into a second sector (26), which is in fluid connection with the second feed opening (13) of the second cooling section (12) of said cooling chamber (9);
   wherein said modulation system (23) comprises:
   at least one first valve (27) placed to intercept the first sector (25) of said feed duct (16) and arranged for feeding the first feed opening (11) of said first cooling section (10) with a first flow of said cooling gas;
   at least one second valve (28) placed to intercept the second sector (26) of said feed duct (16) and arranged for feeding the second feed opening (13) of said second cooling section (12) with a second flow of said cooling gas;
   wherein said plant (1) comprises at least one pressure sensor (70), which is operatively associated with said cooling chamber (9), and is operatively connected to said fan (20) in order to control, in a feedback manner, said fan (20) in order to determine pressure in said cooling chamber (9).

2. The plant of claim 1, wherein said at least one fan (20) is interposed between said heat exchanger (19) and the inlet section (17) of said feed duct (16), and is configured for suctioning said cooling gas through said heat exchanger (19) and introducing said cooling gas into the inlet section (17) of said feed duct (16).

3. The plant of claim 1, wherein:
the first sector (25) of said feed duct (16) comprises a first branch (29), which is extended between a first inlet end (30), which is in fluid connection with the inlet section (17) of said feed duct (16), and a first outlet end (31), which is in fluid connection with the first feed opening (11) of the first cooling section (10) of said cooling chamber (9),
the second sector (26) of said feed duct (16) comprises a second branch (32), which is extended between a second inlet end (33), which is in fluid connection with the inlet section (17) of said feed duct (16), and a second outlet end (34), which is in fluid connection with the second feed opening (13) of the second cooling section (12) of said cooling chamber (9).

4. The plant of claim 3, wherein the first inlet end (30) of said first branch (29) is adjacent to the second inlet end (33) of said second branch (32).

5. The plant of claim 3, wherein said first valve (27) is placed to intercept said first branch (29), and said second valve (28) is placed to intercept said second branch (32).

6. The plant of claim 5, wherein said first valve (27) is placed at the first inlet end (30) of said first branch (29), and said second valve (28) is placed at the second inlet end (33) of said second branch (32).

7. The plant of claim 1, wherein said feed duct (16) comprises a connector tube (35) extended between a first end (36) connected to said inlet section (17) and a second end (37) connected to said dividing structure (23).

8. The plant of claim 4, wherein said feed duct (16) comprises a connector tube (35) extended between a first end (36) connected to said inlet section (17) and a second end (37) connected to said dividing structure (23);
wherein the second end (37) of said connector tube (35) is connected to the first inlet end (30) of said first branch (29) and to the second inlet end (33) of said second branch (32).

9. The plant of claim 1, wherein said first valve (27) and said second valve (28) are arranged so that said first flow is always greater than said second flow.

10. The plant of claim 1, wherein the outlet section (18) of said feed duct (16) comprises a containment body (38), which is extended along said vertical axis (Y) between an upper end (39) and a lower end (40); wherein said containment body (38) comprises:
an internal wall (15), which is extended according to said vertical axis (Y), laterally delimiting said cooling chamber (9), and is provided with said first feed opening (11), at said first cooling section (10), and with said second feed opening (13), at said second cooling section (12);
at least one dividing wall (41) which is placed between said upper end (39) and said lower end (40) and defines, within said containment body (38), at least:
an upper manifold (42), which is extended between said upper end (39) and said dividing wall (41) and connects said first feed opening (11) to the first sector (25) of said feed duct (16), and
a lower manifold (43), which is extended between said dividing wall (41) and said lower end (40) and connects said second feed opening (13) to the second sector (26) of said feed duct (16).

11. The plant of claim 1, further comprising a monomer suction station (60) placed above said cooling station (8) at said inlet mouth (4), comprising a suction system (90) placed in fluid communication with said main channel (3) in order to suction a suction flow;
wherein said first valve (27), said second valve (28) and said suction means are arranged so that the difference between said first flow and said second flow is greater than or equal to said suction flow.

12. The plant of claim 1, further comprising a control unit (80), which is operatively connected to said pressure sensor (70) in order to receive, from said pressure sensor (70), pressure measurements indicative of the pressure in said cooling chamber (9), and is operatively connected to said fan (20) in order to drive said fan (20) as a function of said pressure measurements.

13. The plant of claim 12, wherein said control unit (80) is arranged for executing a comparison of said pressure measurements with at least one reference value, and for varying operating speed of said fan (20) on the basis of said comparison.

14. A method for operating the plant of claim 1, wherein:
filaments (F) for forming a non-woven fabric are introduced in said main channel (3);
said cooling system (14) introduces in said cooling chamber (9) at least one cooling gas for cooling said filaments (F) which traverse said cooling chamber (9);
wherein said fan (20) makes said cooling gas flow through said heat exchanger (19) and through said feed duct (16) from said inlet section (17) towards said outlet section (18);
wherein said method comprises:
arranging the first valve (27) of said modulation means (23) in order to feed the first feed opening (11) of said first cooling section (10) with a first flow of said cooling gas;
arranging the second valve (28) of said modulation means (23) in order to feed the second feed opening (13) of said second cooling section (12) with a second flow of said cooling gas;
determining the pressure in said cooling chamber (9) by controlling, in a feedback manner, said fan (20), by means of the use of said pressure sensor (70) associated with said cooling chamber (9).

15. The method of claim 14, wherein a control unit (80) receives, from said pressure sensor (70), pressure measurements indicative of the pressure in said cooling chamber (9), and drives said fan (20) as a function of said pressure measurements.

* * * * *